June 30, 1936.　　J. R. MAHAN　　2,046,275
WALKING BEAM
Filed Sept. 28, 1932　　2 Sheets-Sheet 1

INVENTOR
J. R. Mahan
by F. N. Barber
attorney

June 30, 1936.  J. R. MAHAN  2,046,275
WALKING BEAM
Filed Sept. 28, 1932  2 Sheets-Sheet 2

INVENTOR
J. R. Mahan
by F. N. Barber
attorney

Patented June 30, 1936

2,046,275

UNITED STATES PATENT OFFICE 2,046,275

WALKING BEAM

Joseph R. Mahan, Toledo, Ohio, assignor to The National-Superior Company, Toledo, Ohio, a corporation of Delaware Application September 28, 1932, Serial No. 635,206

7 Claims. (Cl. 74—41)

My invention relates to walking beam adjusting mechanisms for oil well pumping units. The object of my invention is to provide a walking beam with means for quickly removing it from its normal operating position without detaching the pitman or changing the position of the Samson post bearing. Another object is to provide means for accurately re-alining the beam hanger with the pump barrel.

Figure 1:
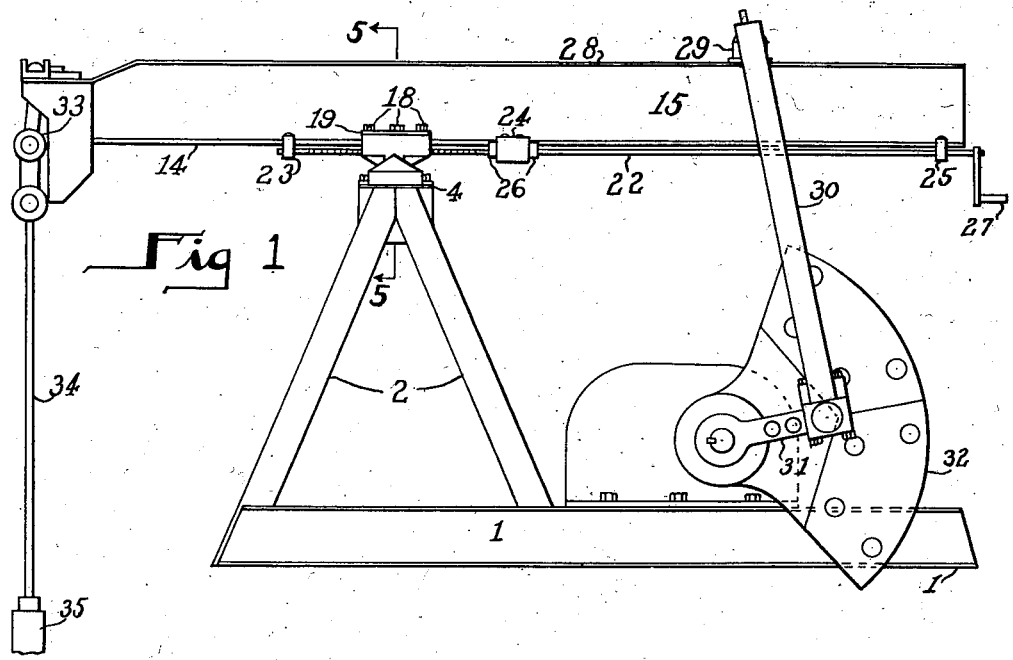
Figure 2:
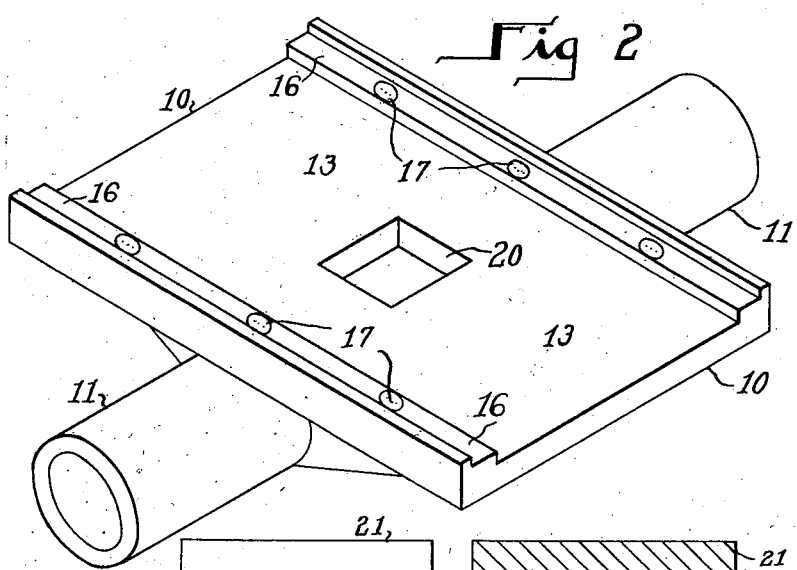
Figure 4:
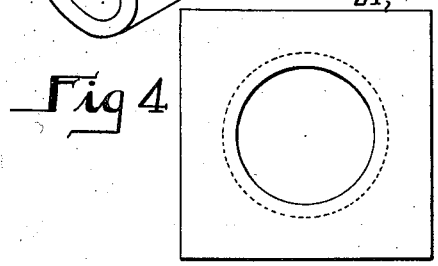
Figure 3:
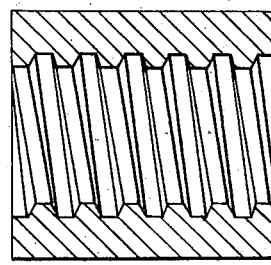
Figure 5:
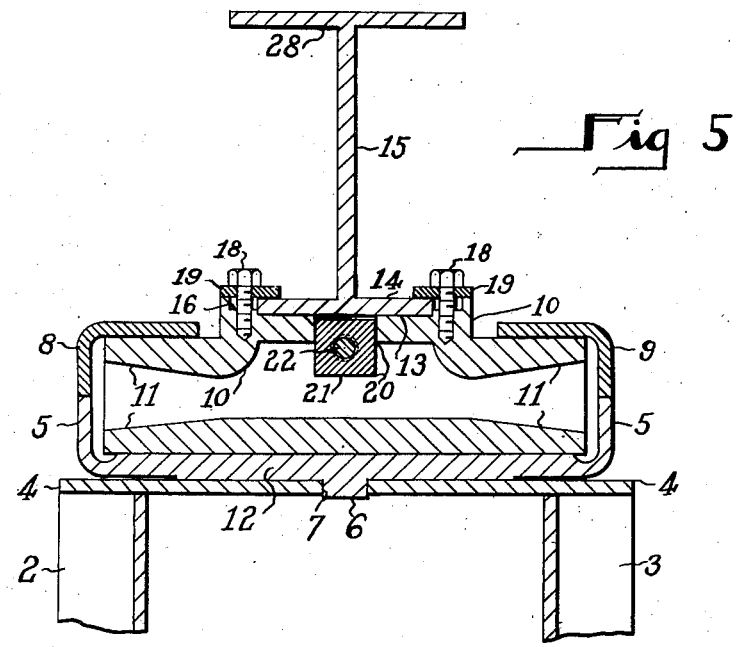
Figure 6:
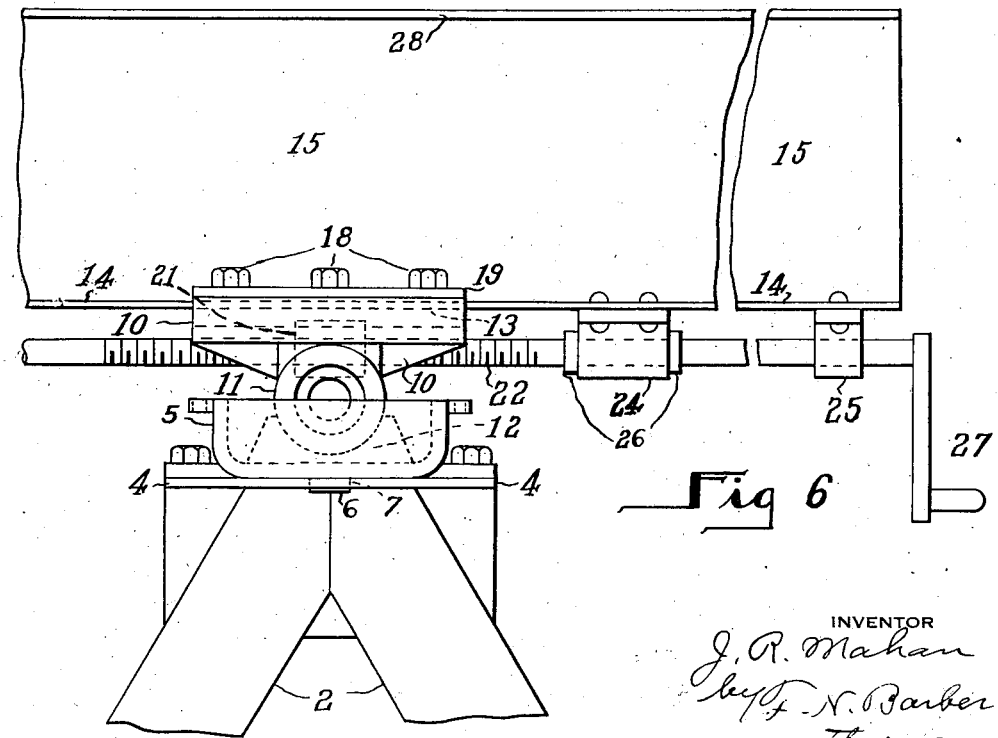

Referring to the accompanying drawings, Fig. 1 is a side elevation of a walking beam showing my invention; Fig. 2, an isometric view of the beam supporting saddle; Fig. 3, a sectional view of an internally threaded block; Fig. 4, an end view of Fig. 3; Fig. 5, a vertical sectional view through the bearing and beam on the line 5—5 of Fig. 1, parts of the standards of which are broken away; and Fig. 6, a side elevation of the walking beam and bearing supports, parts of which are broken away.

On Fig. 1, the horizontal base 1 supports the vertical walking beam standards 2 and 3 which are held in spaced relation by the horizontal top plate 4. The bearing 5, fastened to the top plate, has the square pendent lug 6 protruding through the hole 7 of the top plate 4, preventing the bearing from moving horizontally. 8 and 9 are bearing caps which enclose the upper portion of the bearing chamber at each side.

The beam saddle 10, having as an integral part the journal member 11 is designed to rest in the bearing cradle 12. The top of the saddle contains the groove 13 which is made to receive the bottom flange 14 of the walking beam 15. On each side of the groove and longitudinal thereof are steps 16 which are provided with tapped holes 17.

The bolts 18 secure the clamp plates 19 between the top projecting edges of the saddle to the upper faces of the flanges 14, clamping the walking beam 15 to the saddle.

The square hole 20 in the center of the groove 13 of the saddle is formed to admit the internally threaded block 21. The block is supported by the threaded rod 22 which passes through it. The threaded rod 22 is hung from the underside of the walking beam flange 14 by three brackets 23, 24, and 25. The collars 26, that are placed at each end of the bracket 24, are welded to the rod 22, preventing the same from having any longitudinal motion with respect to the walking beam. The end of the rod is provided with a crank 27 for transmitting rotary motion to the rod.

The upper flange 28 of the walking beam is provided with the bearing 29 for the pitman 30.

The other end of the pitman is connected to a crank arm 31 of the counterbalance 32. The opposite end of the walking beam is provided with the usual pump rod hanger assembly 33 supporting the pump rod 34 which reciprocates in the pump barrel designated as 35.

The operation of my invention is very simple as well as being very valuable. Loosening the bolts 18 will release the clamping action of the plates 19 on the bottom flange 14 of the walking beam. If the crank 27 is then rotated the rod will turn in the threaded block which is held stationary by the hole 20 in the saddle and the rod being fixed to the walking beam will cause it to move backward or forward as the case may be. With this device the end of the walking beam may be quickly removed from its position over the pump barrel, clearing the space above the wells so that other operations may be carried on without hindrance from the walking beam. The walking beam may then be re-positioned by reversing the direction of rotation of the crank 27. When the beam hanger is accurately placed over the pump barrel, the clamping plates may be tightened, securing the beam to the saddle. The pumping unit is then ready for operation.

With this device it becomes unnecessary to disconnect the pitman when backing the beam from its normal position which is a decided advantage in saving time and labor.

The walking beam of this apparatus may be operated by a local and independent source of power or it may be equipped to be operated by pull rods which are not shown. My invention is adaptable to the walking beam regardless of the source of power.

I claim:—

1. In a well-pumping unit, the combination of a bearing member arranged to be mounted on a suitable support, a saddle member journaled in said bearing member, a walking beam supported by said saddle member and arranged to be slid longitudinally thereon, means for clamping the beam fixedly to said saddle member, a threaded block carried by said saddle member, and a screw shaft journaled on said beam and screwed through said threaded block whereby when said clamping means are released the walking beam may be moved longitudinally on the saddle by the proper rotation of the shaft.

2. In a well-pumping unit, the combination of a bearing member arranged to be mounted on a suitable support, a saddle member journaled in said bearing member and provided with a sunken seat, a walking beam engaging said seat with its end portion and supported by said saddle, clamping plates arranged to be bolted to said saddle and overlapping the sides of said seat to engage and hold the beam in fixed relation to said saddle, a threaded block carried by said saddle and held against rotation, and a screw shaft mounted on said beam and screwed through said block whereby when said clamping plates are loosened the walking beam may be adjusted longitudinally relative to the saddle by the proper rotation of said shaft.

3. In a well-pumping unit, the combination of a bearing arranged to be mounted on a suitable support, a saddle provided with journal means engaging said bearing member and arranged to oscillate thereon, a walking-beam supported intermediate of its ends on said saddle and arranged to be slid along the same, a threaded block supported against rotation by said saddle, a screw shaft rotatably supported by the walking-beam and engaging the threaded block, and means for manually rotating said screw shaft whereby to shift the walking-beam longitudinally relative to the saddle and thus vary the location of the axis of oscillation of the walking beam.

4. In a well-pumping unit, the combination of a bearing arranged to be mounted on a suitable support, a saddle provided with journal means engaging said bearing member and arranged to oscillate thereon, a walking-beam supported intermediate of its ends on said saddle and arranged to be slid along the same, a threaded block supported against rotation by said saddle, a screw shaft rotatably supported by the walking-beam and engaging the threaded block, means for manually rotating said screw shaft whereby to shift the walking beam longitudinally relative to the saddle and thus vary the location of the axis of oscillation of the walking beam, and means for clamping the walking beam to the saddle to prevent relative movement between them.

5. A combination as disclosed herein, which consists of: a Samson post; a walking-beam supported thereon having an operating and a retracted position; and means connected to said walking-beam and operative to exert a force for moving said walking-beam transversely relative to said Samson post from operating position into retracted position.

6. A combination for the purposes described, comprising a vertical support, a bearing mounted on said support, a saddle journaled in said bearing, parallel flanges provided at the marginal edges of the saddle, a walking beam adjustably mounted between said flanges, means for moving the walking-beam relative to the saddle, and means cooperating with the flanges to clamp the walking-beam in its adjusted position relative to the saddle.

7. A retractible walking beam structure of the character described, including: a support for a walking beam, a walking beam pivotally carried on said support and adapted to movement horizontally relative to said support from operating position to retracted position; a stationary member; and means operative in substantially horizontal direction between said stationary member and said walking beam to exert a force to move said walking beam between operating and retracted positions.

JOSEPH R. MAHAN.